June 7, 1927.  C. D. SYMMES  1,631,561
AGRICULTURAL INSTRUMENT
Filed March 1, 1926  2 Sheets-Sheet 1

Inventor
Charles D. Symmes
By Faust F. Crampton
Attorney

June 7, 1927.
C. D. SYMMES
1,631,561
AGRICULTURAL INSTRUMENT
Filed March 1, 1926    2 Sheets-Sheet 2
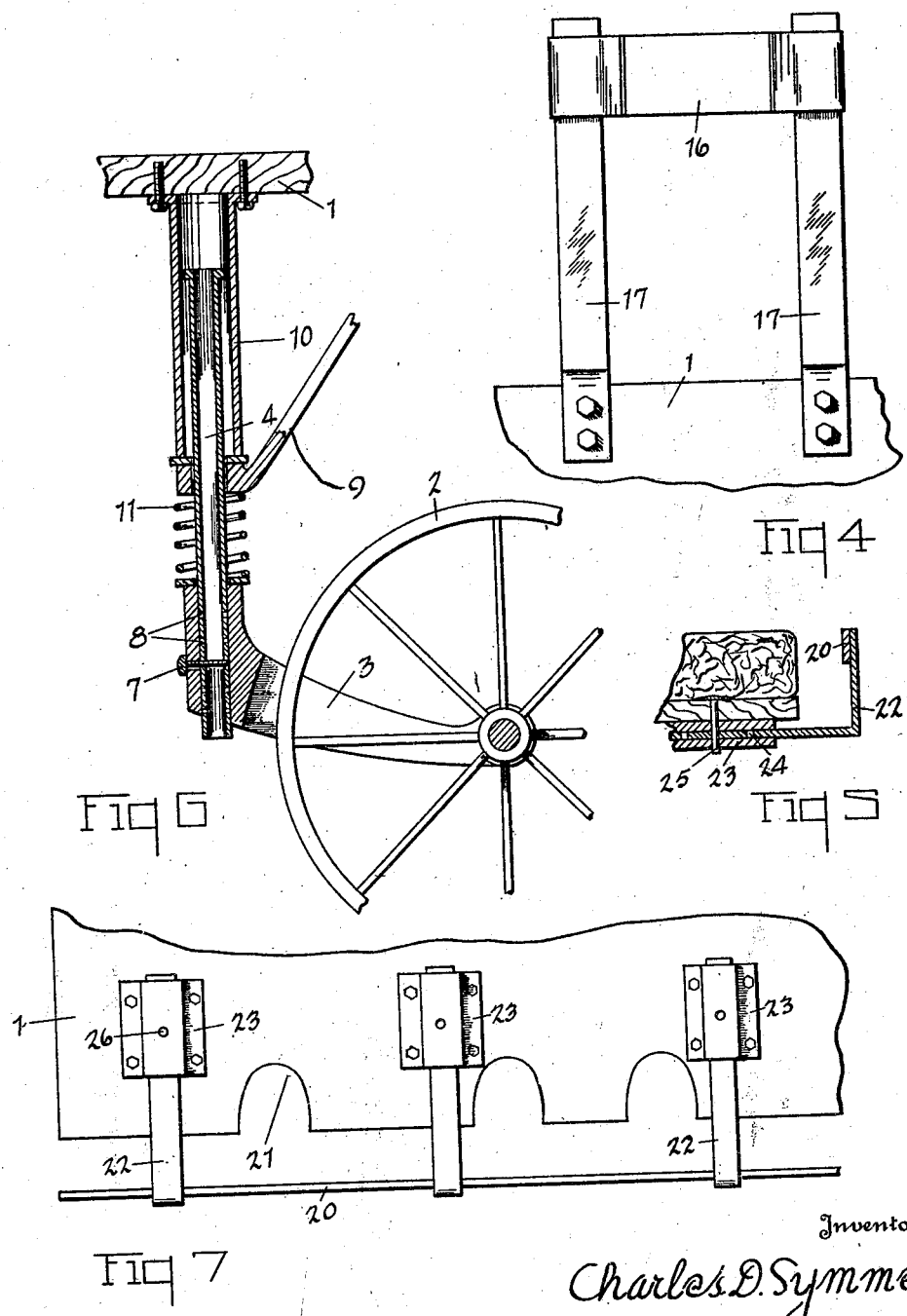

Patented June 7, 1927.

1,631,561

UNITED STATES PATENT OFFICE.

CHARLES D. SYMMES, OF CYGNET, OHIO.

AGRICULTURAL INSTRUMENT.

Application filed March 1, 1926. Serial No. 91,413.

My invention has for its object to provide a means for supporting a worker on vegetation while performing work of a more or less delicate nature over the surface of the ground, such as, thinning of plants or planting small plants, and in such a position that he will be able to pick or handle the plants or manipulate a hoe or cutter or other device for planting, trimming, cutting, or otherwise treating vegetation. The support is preferably in the form of a vehicle that may be drawn along rows of vegetation. If desired, it may be used as a trailer to any agricultural implement or it may be pushed in advance of another agricultural instrument whereby operations may be performed in conjunction with such other instruments.

A structure containing my invention is preferably provided with means whereon the operator may lie face down, means being provided for supporting his forehead at a point slightly below the level of the part of the device that supports the body and so as to give him a good vision over the area that he can reach with his arms or the implements or implement that he uses. It is also preferably provided with a foot bar or other device so that he will be able to engage the bar with his feet and aid him in his movements in rapidly performing his operations on the vegetation, such as, thinning rows to form single separated plants, or separated clusters and to pick the weaker or defective plants. The invention may be used for planting and other operations that are usually done by hand. It provides a means whereby such operations may be performed with dispatch and with ease.

The invention may be contained in structures of different forms, and to illustrate a practical application of the invention, I have selected a structure that contains the invention as an example of such structures and shall describe it hereinafter. The structure selected is shown in the accompanying drawings.

Figure 1:
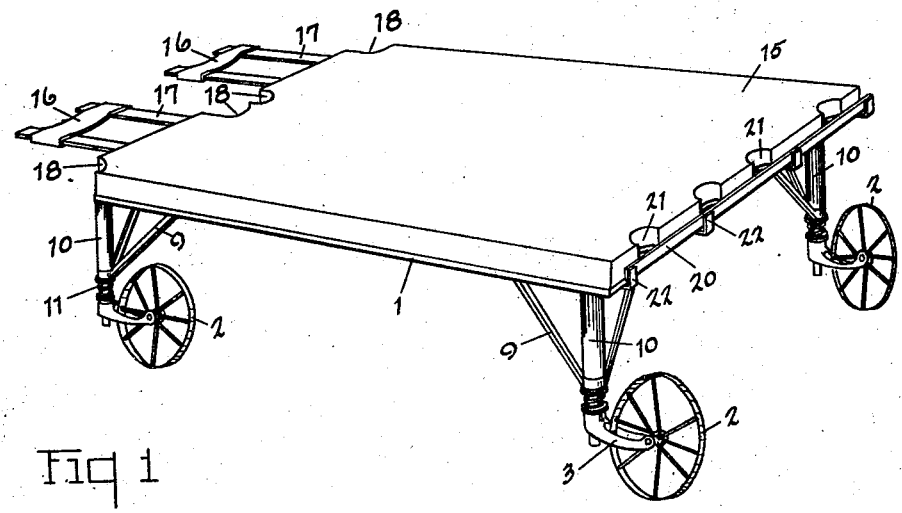
Figure 2:
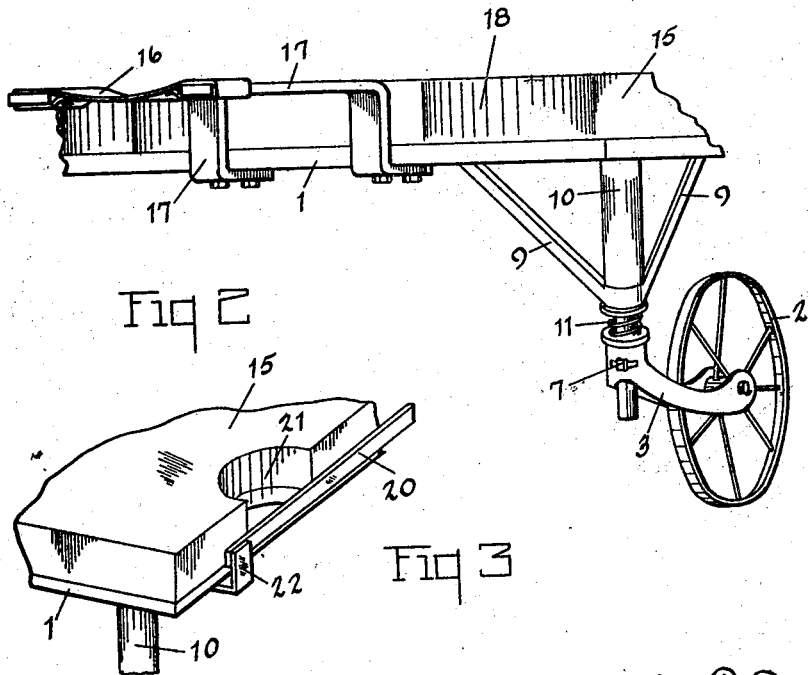
Figure 3:
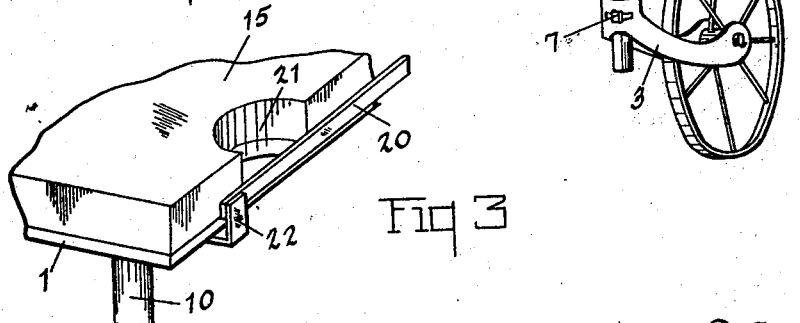

Figure 1 is a perspective view of the agricultural implement. Fig. 2 is a view of one corner of the instrument showing the head rest. Fig. 3 is a view of another corner of the instrument showing the foot bar. Fig. 4 is a top view of the head rest and Fig. 5 is a view of a section showing the adjustable connection of the foot bar. Fig. 6 is a view of one of the wheels that support the instrument, part being shown in section. Fig. 7 is a bottom view of a part of the platform or body of the instrument.

In the form of construction shown in the drawings, a platform is suitably mounted on wheels whereby it may be drawn over the ground while the agricultural operations are being performed, such as planting or thinning or other operations that are usually performed manually. The platform 1 is suitably supported on the wheels 2. The wheels are preferably caster-wheels and are pivotally connected to the yokes 3 that are adjustably secured to the rod or pipe 4 as shown in Fig. 6 by means of the bolt 7 which may be inserted into the base of each yoke 3 and through any one of the holes 8 formed in the rod 4. The rod 4 may extend through braces 9 that are connected to the bottom of the platform 1. The rod 4 also extends into the sleeve 10. A spring 11 is located intermediate the brace 9 and the yoke 3 whereby the platform 1 will be yieldingly supported by means of the springs 11.

A suitable cushion member 15 may be located on the platform 1 for supporting the body of the operator. In the form of construction shown, the implement is made sufficiently wide to cover a plurality of parallel rows of vegetation and so as to support two operators that may work on four rows or as many more as may be desired, within, of course, the limitations of the device, and according to the distance between the rows. Any form of cushion device may be used which will enable the operators to work the desired length of time each day. The operators lie upon the cushion device 15 face down and their foreheads rest upon the straps 16 that are looped around the ends of the brackets 17 which are secured to the platform 1. The straps 16 in each case will support the forehead slightly below the level of the cushion supporting means in order to give to the operator good vision of the rows of vegetation through the space between the brackets 17, the straps 16 and the platform and its cushioned part 15.

The platform and the cushion part are also provided with recesses 18 to receive the arms of the operator and so as to enable him to reach in all directions with both arms and perform such operations on the vegetation as is intended while the agricultural implement is being drawn over the ground. Also a foot bar 20 is secured at the rear end of the implement and in position so that the operator can readily engage the bar, particularly, between the heel and the sole of the shoe, which will enable him to manipulate his trunk so as to make such movements as may be desired with reference to the planting or treating of the vegetation. A plurality of recesses 21 may also be disposed along the rear edge or end of the platform for receiving the feet of the operator which will also cooperate in aiding him to make extreme arm movement as he desires. The foot part 20 may be made adjustable by means of the brackets 22 which are secured to the foot bar and extend into straps or staple members 23 that are bolted to the underside of the platform 1. Each bracket member 22 is provided with a plurality of openings 24 and a bolt or pin 25 may be dropped through the platform and any one of the holes 24 and through the hole 26 that is formed in the strap 23. Thus the foot bar 20 may be placed more or less remote from the rear edge of the platform.

I claim:

1. In a vehicle, a platform part for supporting a vegetation operator face down, a pair of arms connected to one end of the platform and a flexible strap connecting the ends of the arms and forming a forehead support for the operator, the platform supporting part having a recess located on each side of the forehead support for receiving the arms of the operator, the platform operating to support the chest of the operator while using his arms in manipulating the soil.

2. In a vehicle, a platform part for supporting a vegetation operator face down, a forehead support connected to the platform and extending from one end of the platform, the plane of the forehead support part being located below the plane of the platform supporting part, the platform supporting part having a recess located on each side of the forehead supporting part for receiving the arms of the operator, a foot bar for engagement of the feet of the operator, located along the rear edge of the platform, the rear edge portion of the platform having recesses for receiving the feet of the operator.

In testimony whereof I have hereunto signed my name to this specification.

CHARLES D. SYMMES.